US011542971B2

(12) United States Patent
Heiselbetz

(10) Patent No.: US 11,542,971 B2
(45) Date of Patent: Jan. 3, 2023

(54) FASTENING DEVICE FOR A SHIELDING PART, AND SHIELDING PART COMPRISING THE FASTENING DEVICE

(71) Applicant: ElringKlinger AG, Dettingen-Erms (DE)

(72) Inventor: Gerald Heiselbetz, Langenzenn (DE)

(73) Assignee: ElringKlinger AG, Dettingen-Erms (DE)

( * ) Notice: Subject to any disclaimer, the term of this patent is extended or adjusted under 35 U.S.C. 154(b) by 285 days.

(21) Appl. No.: 16/954,141

(22) PCT Filed: Oct. 26, 2018

(86) PCT No.: PCT/EP2018/079409
§ 371 (c)(1),
(2) Date: Jun. 15, 2020

(87) PCT Pub. No.: WO2019/115076
PCT Pub. Date: Jun. 20, 2019

(65) Prior Publication Data
US 2021/0164505 A1   Jun. 3, 2021

(30) Foreign Application Priority Data
Dec. 14, 2017   (DE) .......................... 102017130001.5

(51) Int. Cl.
*B60R 13/08*  (2006.01)
*F16B 5/02*   (2006.01)
*F16F 1/02*   (2006.01)

(52) U.S. Cl.
CPC ............ *F16B 5/0241* (2013.01); *F16F 1/025* (2013.01); *B60R 13/0876* (2013.01);
(Continued)

(58) Field of Classification Search
CPC ... F16B 5/0241; F16B 2200/503; F16F 1/025; B60R 13/0876; B60R 13/0884; B60R 2013/0807
(Continued)

(56) References Cited

U.S. PATENT DOCUMENTS

2005/0028963 A1   2/2005  Niwa
2015/0345538 A1*  12/2015 Friedow .................. F16B 43/00
                                                                411/544

FOREIGN PATENT DOCUMENTS

CN      105140724 A    12/2015
DE      20218301 U1 *  2/2003 .............. F16B 21/06
(Continued)

OTHER PUBLICATIONS

Machine translation of DE 277 (Year: 2019).*

*Primary Examiner* — Hilary L Gutman

(57) ABSTRACT

A fastening device for fastening a shielding part to a partnered fastening part, having:
  a sleeve with a through opening for a fastener;
  at least two bridging elements, which are equipped with outer regions in a radial direction for indirect or direct contact with the opposing outsides of the shielding part and are fastened to the sleeve with inner regions in the radial direction;
  a damping element is positioned between the bridging elements in an axial direction and outside of the sleeve in the radial direction, characterized in that
  the damping element is embodied as a spring element and has at least one spring arm, which is resiliently flexible in the radial direction and is equipped to cooperate in a supporting way with a hole rim of a hole of the shielding part.

14 Claims, 13 Drawing Sheets

(52) U.S. Cl.
CPC ... *B60R 13/0884* (2013.01); *B60R 2013/0807* (2013.01); *F16B 2200/503* (2018.08)

(58) Field of Classification Search
USPC ........................................................ 403/221
See application file for complete search history.

(56) References Cited

FOREIGN PATENT DOCUMENTS

| | | | | |
|---|---|---|---|---|
| DE | 202016102795 U1 | 8/2017 | | |
| DE | 102016106150 A1 | * 10/2017 | ......... | B60R 13/0876 |
| DE | 102016106151 A1 | * 10/2017 | | |
| DE | 102016106152 A1 | 10/2017 | | |
| DE | 102016106153 A1 | 10/2017 | | |
| DE | 102018113277 A1 | * 12/2019 | | |
| WO | 2012030640 A1 | 3/2012 | | |
| WO | WO-2017019539 A1 | * 2/2017 | ......... | B60R 13/0869 |

* cited by examiner

FASTENING DEVICE FOR A SHIELDING PART, AND SHIELDING PART COMPRISING THE FASTENING DEVICE

FIELD OF THE INVENTION

The invention relates to a fastening device for a shielding part and a shielding part having this fastening device.

BACKGROUND OF THE INVENTION

DE 10 2016 106 153 A1 has disclosed a fastening device for a shielding part of this generic type.

A fastening device of this kind has proven to be of value. But there is still a need to disclose a fastening device, which is inexpensive and can be produced from a small number of parts and which in particular is not sensitive to contamination and easy to install. In addition, an alternative should be disclosed that avoids the use of a wire knit.

SUMMARY OF THE INVENTION

A fastening device according to the invention is particularly suitable for fastening a shielding part to a partnered fastening part and has:
- a sleeve with a through opening for a fastener;
- at least two bridging elements, which are equipped and embodied with outer regions in a radial direction R for indirect or direct contact with the opposing outsides of the shielding part and are fastened to the sleeve with inner regions in the radial direction R;
- a damping element is positioned between the bridging elements in an axial direction A and outside of the sleeve in the radial direction R.

It is also characterized in that
- the damping element is embodied as a spring element and has at least one spring arm, which is embodied as resiliently flexible in the radial direction R and is equipped and embodied to cooperate in a supporting way with a hole rim of a hole of the shielding part.

With such a fastening device, it is possible, relative to a hole rim of a shielding part, to create a resiliently supported fastening device so that no hard impacts of the sleeve against the hole rim occur, for example when subjected to a vibration load. It also avoids the use of the relatively costly-to-produce wire knit that is used in the prior art. In addition, the embodiment of the fastening device according to the invention sharply reduces or even avoids an accumulation of dirt in the openings of a wire knit possibly occurring over the service life of the fastening device.

In a preferred embodiment of the fastening device according to the invention, the damping element is embodied as a stamped and bent sheet metal part with spring arms arranged in distributed fashion in a circumference direction U.

With such an embodiment, the spring element for supporting the fastening device relative to a hole rim in the shielding part can be produced as a component in a particularly inexpensive and simple way.

In addition, a damping element that is embodied in this way ensures a resilient support of the fastening device in all radial directions R relative to the hole rim of the shielding part.

Another preferred embodiment is characterized in that the damping element rests against the sleeve without play, particularly in a radially prestressed way.

This particularly contributes to the low-noise embodiment of the fastening device since no rattling between the damping element and the sleeve can occur due to play between these components or even after a longer operating time.

In another embodiment, the fastening device is characterized in that the damping element is affixed relative to the sleeve in the radial direction R in a rigid or resiliently flexible way.

Particularly when the damping element is affixed relative to the sleeve in a resiliently flexible way, the resilient damping can also be adjusted more precisely relative to the spring arms in the radially outer regions and it is thus possible for a resilient support of the sleeve (spring characteristic) relative to the shielding part to be predetermined within stricter limits.

Another special embodiment of the fastening device is characterized in that the damping element is embodied as an open spring washer, e.g. a split spring washer.

With such an embodiment of the damping element as an open spring washer, the damping element can be preassembled around the sleeve in a simple way, e.g. in a manner similar to a piston ring, and then processed further as a preassembled unit.

The damping element, as an open spring washer, can rest on a cylindrical outside of the sleeve or possibly in a groove that is provided in the cylindrical outside of the sleeve. It can also be supported on a collar or similar projection of the sleeve.

By means of suitable bevels or similar chamfers, it is also possible in a simple way to easily achieve a mounting of the damping element relative to the sleeve in an axial mounting direction relative to each other since an open spring washer can be correspondingly widened against the bevel surfaces and then comes to rest against the outer circumference surface in a resiliently prestressed way.

In another preferred embodiment, the fastening device is characterized in that the damping element has at least two detent projections that are equipped and embodied to catch behind a hole edge after being mounted in the shielding part in the mounting direction M.

In this embodiment, in addition to the spring arms, the damping element also has detent projections, which in a particularly preferred way, are likewise embodied in the form of punched-out regions and possibly bends of the raw sheet metal to produce the damping element. These detent projections are equipped and embodied in such a way that they are able to catch behind a hole edge of the opening or fastening hole in the shielding part so that the fastening device in a partially mounted state can be clipped into the opening of the shielding part in the axial direction and by means of the detent projections, is fixed in position in advance in a form-fitting way relative to the opening until a second bridging element is mounted relative to the sleeve and a final mounting state is thus achieved. Under urgent circumstances, the detent projections are thus used for temporarily fixing the fastening device in position in a partially mounted state and then in the finally mounted state, are no longer absolutely needed.

In another embodiment of the fastening device according to the invention, the detent projections are each positioned in the circumference direction U in a space between the spring arms.

Such a positioning is the obvious choice due to the presence of corresponding gaps between the spring arms. Naturally, detent projections do not absolutely have to be present in each space between two spring arms. For example, two or better yet three or more detent projections can also be distributed over the circumference.

In another preferred embodiment of the fastening device, the spring arms are positioned on a spring arm support ring and the detent projections are positioned on a separate detent projection support ring.

Such a design does indeed increase the total number of required components (one ring with spring arms and one ring with detent projections), but it enables a somewhat simpler production of the components.

This makes it necessary to carry out a corresponding cost/effort assessment as to whether a one-piece damping element, which has the spring arms and the detent projections composed of one piece, is more advantageous or the embodiment as a damping element with spring arms and as a detent element with a detent projection support ring and detent projections.

In another preferred embodiment of the fastening device, spring arms are present, which extend out from the spring arm support and are provided for the radially inner support of the spring element relative to the sleeve.

Spring arms of this kind, which are provided for the resilient support in the radial direction R toward the inside relative to the sleeve, can in particular have a different spring stiffness or elasticity than the spring arms that are positioned on the radial outside and serve to resiliently support the fastening device on the hole rim of the shielding part.

With this embodiment, it is possible to set a fine tuning of the resilient support (spring rate of the sleeve in the radial direction relative to the shielding part). In addition, the provision of spring arms toward the inside in the radial direction for supporting the damping element relative to the sleeve is advantageous in that it is easily possible to provide a snap-on solution of the damping element onto the sleeve even if the damping element is embodied as a closed ring, i.e. one that is not split.

In another preferred embodiment, the fastening device is characterized in that the spring support ring rests in a groove in the sleeve.

In such an embodiment, the spring support ring and thus the damping element, as described above, can be mounted relative to the sleeve in a manner similar to a piston ring.

In another preferred embodiment, in the fastening device, the bridging elements are each fastened to the sleeve at the axial end surfaces of the sleeve.

An embodiment of this kind makes it possible to produce the sleeve in one piece as a raw element and, for example in a production step that has an actuating direction only in the axial direction A, to connect the bridging elements to the sleeve element (particularly by means of a flanging or grooving).

In another preferred embodiment, the bridging elements can be disk-like, cross-sectionally cup-shaped bodies, which, in the assembled state, cooperate with the shielding part and the sleeve to form a closed annular cavity in which the spring element, i.e. the damping element, is positioned.

With this embodiment, it is easily possible to produce a cavity, which is largely protected from contamination and contains the damping element, so that even when a high contamination load of the shielding part exists, a contamination load of the damping element and a penetration of dirt into the cavity containing the damping element are sharply reduced or eliminated.

This provides better assurance of the damping properties or the damping and/or resilient properties of the damping element over its service life.

In another embodiment, the fastening device according to the invention is characterized in that the sleeve has a flanging collar at each of its axial end surfaces, to which the bridging elements can be fastened in one work step with an actuating direction B of a crimping tool/riveting tool oriented in an axial direction A.

These measures contribute to a simple mounting of the fastening device according to the invention onto a shielding part; the entire mounting/fastening of the fastening device to the shielding part can be carried out by means of a joining process that takes place in the axial direction A.

A shielding part having at least one fastening device according to the invention solves the problems of the invention relating to the shielding part.

The fastening device according to the invention is embodied as a compact, multi-part assembly, which is fitted into a receiving opening of the shielding part from both sides. One unit of the assembly is supplied for the mounting as an already preassembled, detent-enabled component. A detent element described further below or at least one detent projection can make a valuable contribution to this. In the mounting of the fastening device, it is therefore unnecessary to comply with any particular sequence and installation position of a plurality of different individual parts relative to the shielding part. Because of its design, which is also resilient in the axial direction A, the fastening device is also not tied to the use of a particular sheet thickness of the shielding part and can therefore be used for all conventionally used sheet thicknesses that are used for spacing parts. This therefore avoids the generation of variants since a large number of bridging elements can be used to produce different fastening devices.

Support surfaces of resilient parts of the fastening device on corresponding outsides of the shielding part are designed so that they come into direct contact with only a minimal area of the outsides of the shielding part, which are often provided with an anti-corrosion coating, thus preventing damage to the surface due to friction. Additional sliding disks, which are often used in the prior art, are not required with the invention since their function is taken over by the outer resilient parts of the bridging elements. The axial damping of the fastening device is carried out by the resilient action of the components resting against them, i.e. the bridging elements, in particular that of their radially outer regions against the outsides of the shielding part. The radial damping of the fastening device is carried out by means of the spring element used on the inside of the fastening device, which element functions as a radial spring that prevents the sleeve from striking the rim of the opening of the shielding part and thus prevents undesirable noise generation.

The following particular advantages of the invention should be mentioned:

- One component (lower assembly) of the fastening device can be supplied as a preassembled unit to the final mounting, i.e. to the mounting of the fastening device in the shielding part.
- In a preferred embodiment, the preassembled unit can engage in detent fashion in the installation bore of the thermal shield and can thus be fixed in position in advance.
- The second component (the second transmission element in this case), which together with the first component (lower assembly) can constitute the entire fastening device, is only a single part, which facilitates the handling and conveying of the second component to the mounting site.
- In the assembly, only a small amount of joining effort is required and it is not necessary to comply with any sequence or any particular installation position of individual parts since only two components are provided for the final mounting, which can be mounted to each other in only one meaningful position.

The fastening device is mounted to the shielding part from both sides. A single mounting direction is sufficient. In the context of the invention, only translatory joining steps in an axial direction A take place.

Because of the resilient components (the resilient bridging elements), the use of the fastening device is independent of the sheet thicknesses of the shielding part that are used. It is thus not necessary to use a particular variant design or to keep on hand a store of different variants.

The support surfaces of the fastening device are minimized, as a result of which only a small amount of friction can be generated between the fastening device and the exposed surfaces of the shielding part. This makes it possible to dispense with providing additional sliding disks.

A possibly provided anti-corrosion coating such as a protective aluminum coating of the shielding part is not damaged by friction due to the contact with a wire knit, which is usually used as a damping element in the prior art, and therefore no corrosion occurs.

The invention presents a closed design of a fastening device, i.e. an opening in a shielding part for accommodating a fastening device is completely closed by the fastening device in every relative position thereof relative to the shielding part so that no openings remain through which the thermal radiation can bypass the shielding part directly.

This therefore reduces the heat transfer.

The fastening device as a whole features a flat and compact design; the simple design enables a resilient damping action of the fastening device relative to the shielding part in an axial direction and also in a radial direction. In the opening provided for the fastening device in the shielding part, the fastening device is able to move radially in order to compensate for thermal stresses.

A directly touching contact between the sleeve and the shielding part is avoided by means of the inner radial spring, which functions as a damping element in the radial direction R. Because it is made of only metallic components, one embodiment of the fastening device according to the invention has a particularly high thermal stability.

BRIEF DESCRIPTION OF THE DRAWINGS

The invention will be explained in greater detail below by way of example based on the drawings. In the drawings:

FIG. 1c: shows a partially cut-away cross-sectional view of the embodiment according to FIG. 1a;

FIG. 1f: shows a perspective view of the embodiment according to FIG. 1e in an installed/mounted state with a fastener;

FIG. 1g: shows a partially cut-away cross-sectional view of a third embodiment of the fastening device according to the invention and of the shielding part according to the invention;

FIG. 3a: shows a second embodiment of the spring element suitable for a fastening device according to the invention;

FIG. 3b: schematically depicts a second intermediate mounting state in a partially cut-away (perspective) view of an embodiment of the fastening device/shielding part equipped with the spring element according to FIG. 3a;

DETAILED DESCRIPTION OF THE PREFERRED EMBODIMENTS

Figure 1A:
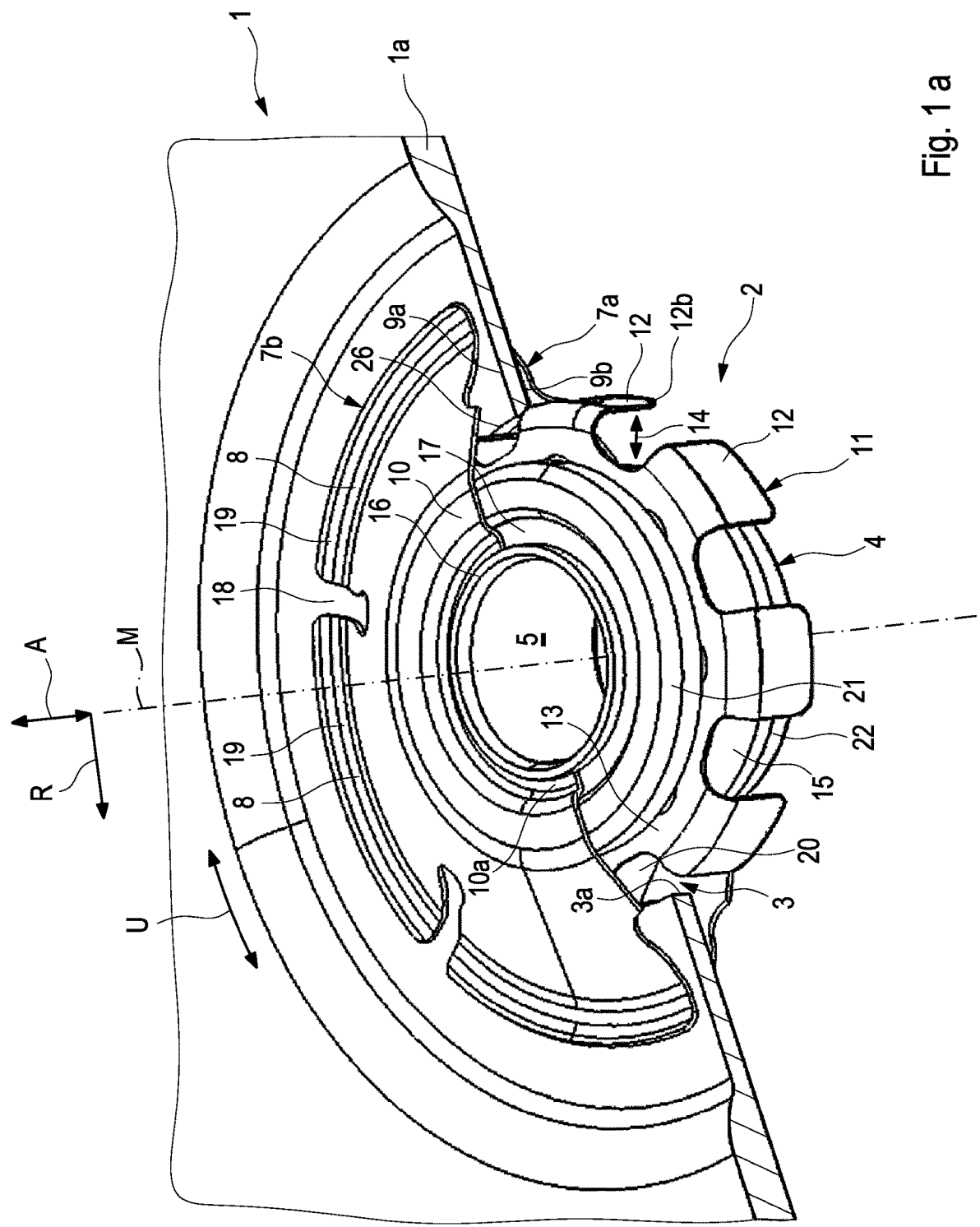
FIG. 1a: shows a partially cut-away perspective view of a first embodiment of the fastening device according to the invention, installed in a shielding part according to the invention.

FIG. 1a shows a first embodiment of a shielding part 1 according to the invention equipped with a fastening device 2 according to the invention. The fastening device 2 sits in an opening 3 of the shielding part 1. The opening 3 has a hole rim 3a. The shielding part 1 is embodied in the usual way as a single-layered or multi-layered flat component 1a that is made of metal or is heat-resistant in some other way. The shielding part 1—or more precisely, its flat component 1a—is particularly embodied as a thermal shielding component and/or as an acoustic shielding component.

The fastening device 2 according to the invention has a sleeve 4, which has a through opening 5 through which a fastener 6 (see FIG. 1f) such as a screw can be inserted. The fastener 6 is used to fasten the shielding part 1 along with the fastening device 2 according to the invention to a partnered fastening part (not shown), e.g. in a turbocharger, an exhaust manifold, or similar hot components or e.g. to body areas. The fastening device 2 also has at least two bridging elements 7a, 7b.

In the following, an axial direction A, a radial direction R, and a circumference direction U are established for purposes of the further description. The axial direction A is oriented parallel to a center line M of the through opening 5. The radial direction R is oriented perpendicular to the center line M and points away from it.

The circumference direction U is shown by way of example with an arrow 14 in FIG. 1a and extends around the central axis M.

In a radial direction R, the bridging elements 7a, 7b have outer regions 8, which are equipped and embodied to be placed indirectly or directly against opposing outsides 9a, 9b of the shielding part 1 or more precisely its flat component 1a. With radially inner regions 10, the bridging elements 7a, 7b are connected to the sleeve 4, in particular to an end surface of the sleeve 4, which is oriented in the axial direction A.

A damping element 11 is positioned in the axial direction A between the bridging elements 7a, 7b and in the radial direction R outside the sleeve 4. The damping element 11 is embodied as a spring element 11 and has at least one spring arm 12, in particular a plurality of spring arms 12, which are arranged in distributed fashion in the circumference direction U. Each spring arm 12 is integrally connected to a spring arm support ring 13. Each spring arm 12 is embodied as resiliently flexible in the radial direction R (arrow 14) and is equipped and embodied to cooperate in supporting fashion with the hole rim 3a of the opening 3 of the shielding part 1.

In particular, all of the spring arms 12 are integrally supported on one and the same spring arm support ring 13 so that the damping element/spring element 11 is embodied as a one-piece spring element. The spring arm support ring 13, e.g. in the form of a flat sheet-metal structure, extends radially from an outside 15 of the sleeve 4. Each spring arm 12 is connected to the spring arm support ring 13 with an approximately right-angled bend and extends essentially in the axial direction A. An outer diameter of the spring element or more precisely of the damping element 11 in this case is preferably selected to be less than or equal to a hole diameter of the opening 3 so as to ensure a radial mobility of the fastening device 2 inside the opening 3 of the shielding part 1. Only after a mobility limit is reached do the spring arms 12 come into contact with the hole rim 3a and delimit a further mobility of the fastening device 2 inside the opening 3. This happens in a resiliently flexible way because of the spring arms 12 and is also damped because of the inherent damping of the material used for the damping element 11 so that a noise-free and gentle contacting of the fastening device 2 against the hole rim 3a of the opening 3 takes place. This prevents undesirable noise generation, e.g. due to vibrations.

Even if a contact between the spring element 11 and the hole rim 3a takes place, e.g. due to vibrations or due to thermal expansions, then this contact is nevertheless not rigid and, because of an increased exertion of force between the fastening device 2 and the shielding part 1, can still be expanded within limits by overcoming the spring forces of the spring arms 12.

In addition to the inherent damping inherent in the material of the spring arms 12 and of the damping element 11, the damping properties of the entire fastening device 2 are further bolstered by the resilient contact of the radially outer regions 8 of the bridging elements 7a, 7b with the opposing outsides 9a, 9b of the shielding part 1. In these regions, a frictional contact takes place between the bridging elements 7a, 7b and the opposing outsides 9a, 9b of the shielding part 1, which additionally produces a damping of a relative movement between the fastening device 2 and the shielding part 1 in the radial direction R.

The damping element 11 is preferably produced in the form of a stamped and bent part, e.g. of a metallic sheet metal material. The sleeve 4 is preferably produced of one piece, possibly of metal and/or plastic. If the thermal conditions of use allow, the fastening device 2 according to the invention as a whole or any individual parts thereof can be embodied of suitable plastics.

At the end surface, the sleeve 4 has flanging collars 16. An annular groove 17 at the end surface is provided radially outside the flanging collars 16. A corresponding region of the bridging elements 7a, 7b makes contact in the annular groove 17. The flanging collars 16 are placed on the radial outside in order to connect the bridging elements to the sleeve 4 and thus secure the bridging elements 7a, 7b at their respective end surfaces of the sleeve 4.

It is particularly preferable that the damping element 11 rests on the outside 15 of the sleeve 4 without play in the radial direction R relative to the sleeve 4 and in particular, is radially prestressed against it.

Due to a play-free support, or more precisely due to a resiliently prestressed support, of the damping element 11 against the outside 15 of the sleeve 4, it is possible to achieve a further noise reduction under vibration load.

It can also be suitable to provide a groove (not shown), e.g. an annular groove on the outside 15 of the sleeve 4, in which a damping element 11 resiliently engages, which is embodied as split, for example in the manner of a piston ring. By means of a groove of this kind, it is possible to 4 ensure a simple immobilization of the damping element 11 in the axial direction A relative to the sleeve 4.

The bridging elements 7a, 7b have a disk-shaped, cross-sectionally cup-shaped three-dimensional form and are formed, for example, of a spring steel or another suitable flat workpiece.

The bridging elements 7a, 7b can have slits 18 extending radially inward from the outer regions 8. Spring tabs 19 are formed between two such slits 18, which are arranged in distributed fashion in the circumference direction U. It is also possible, however, to embody the bridging elements 7a, 7b as closed cup-like elements without slits 18. This produces a closed cavity 20, which is delimited by the hole rim 3a, the bridging elements 7a, 7b, and the sleeve 4 or more precisely the outside 15 thereof. Embedded in this closed cavity 20, the damping element 11 is well-protected from dirt and/or dust and the like.

Figure 1B:
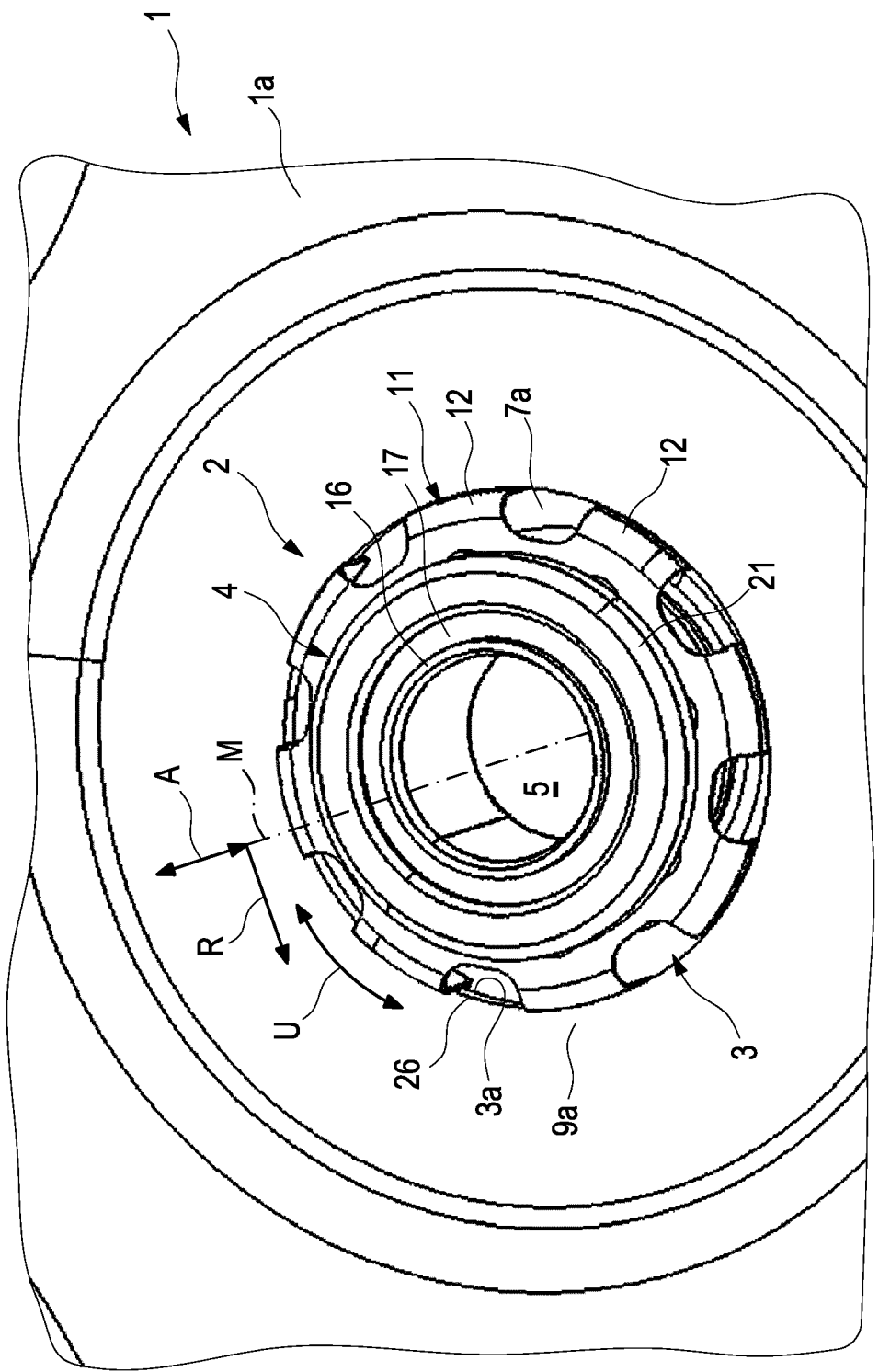
FIG. 1b: shows a perspective view from beneath of the fastening device according to the invention shown in FIG. 1a in a state in which it is partially mounted to a shielding part.

FIG. 1b shows an intermediate mounting state of a fastening device 2 according to the invention in an opening 3 of the shielding part 1. One of the bridging elements 7a is connected to the end surface of the sleeve 4. The sleeve 4 is provided with the damping element 11. In the present case (FIG. 1b), the outer diameter of opposing spring arms 12 is selected in such a way that this is slightly greater than the diameter of the opening 3 in the shielding part 1 so that a resiliently prestressed holding of the composite made up of a first bridging element 7a, the sleeve 4, and the damping element 11 in the opening 3. Such a positioning results in the fact that there is no free mobility of the fastening device 2 inside the opening 3; instead, any mobility in the radial direction simply has to occur in opposition to a spring force of the spring arms 12.

In the intermediate mounting state shown in FIG. 1b, it is now only necessary to place a single bridging element 7b (which is not shown in FIG. 1b) onto the free end surface of the sleeve 4 and rivet or crimp it there or fasten it in some other way, e.g. by radially flanging the flanging collar 16 with a suitable flanging tool, e.g. a mandrel, radially outward.

Figure 1C:
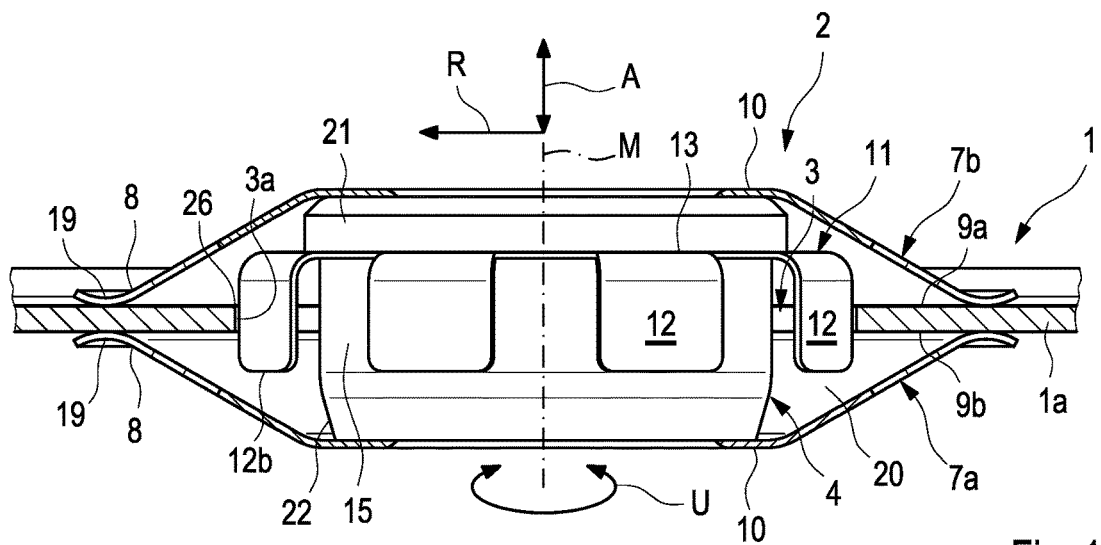
Figure 1D:
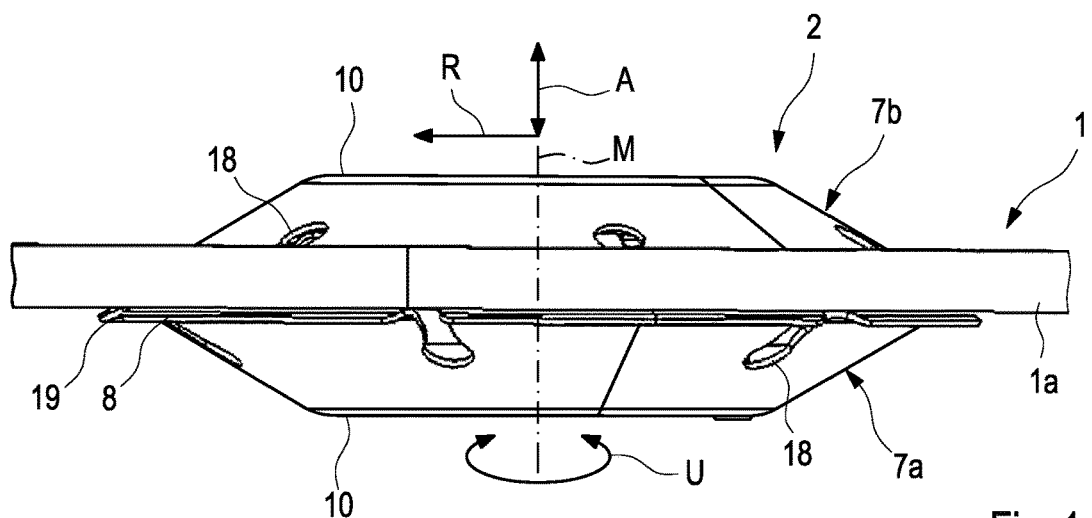
FIG. 1d: shows a side view of the first embodiment of the fastening device according to the invention, and of the shielding part according to the invention.
Figure 1E:
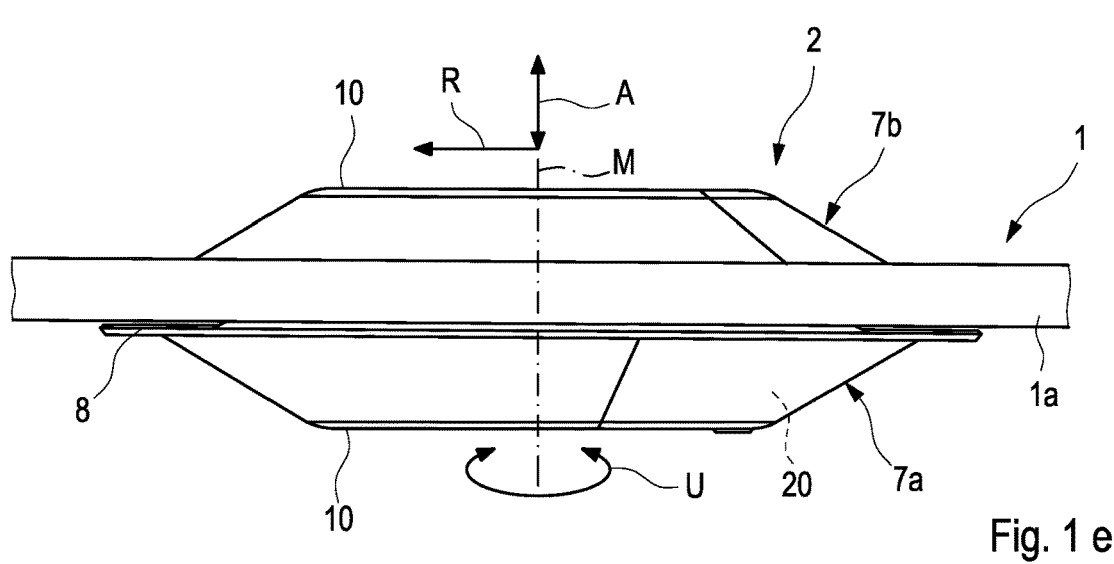
FIG. 1e: shows a side view according to FIG. 1d of a second embodiment of the fastening device according to the invention and of the shielding part according to the invention.
Figure 1:
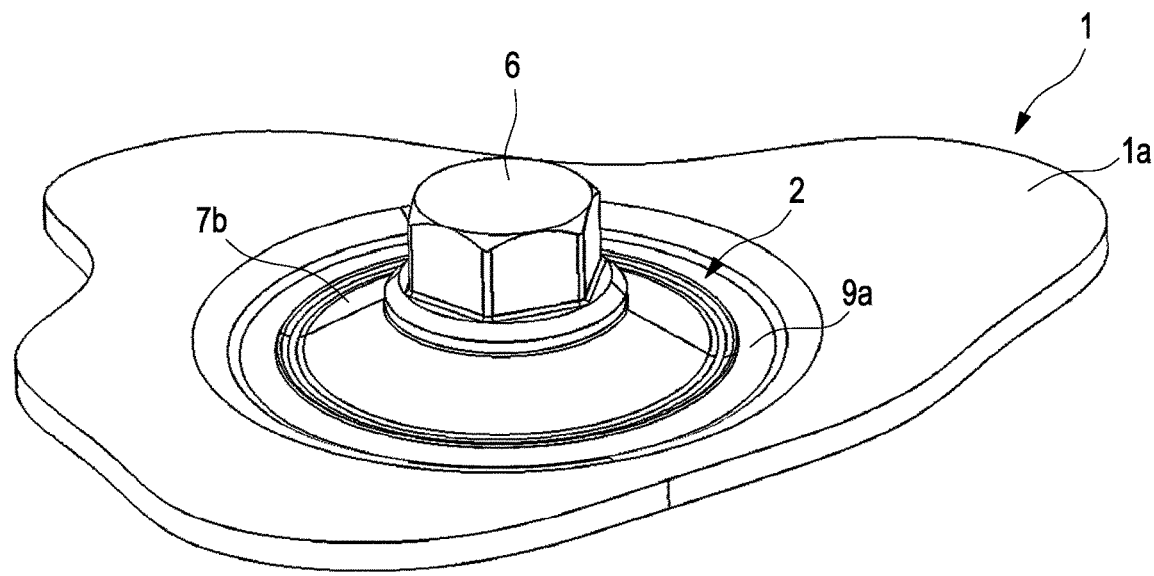
Figure 1:
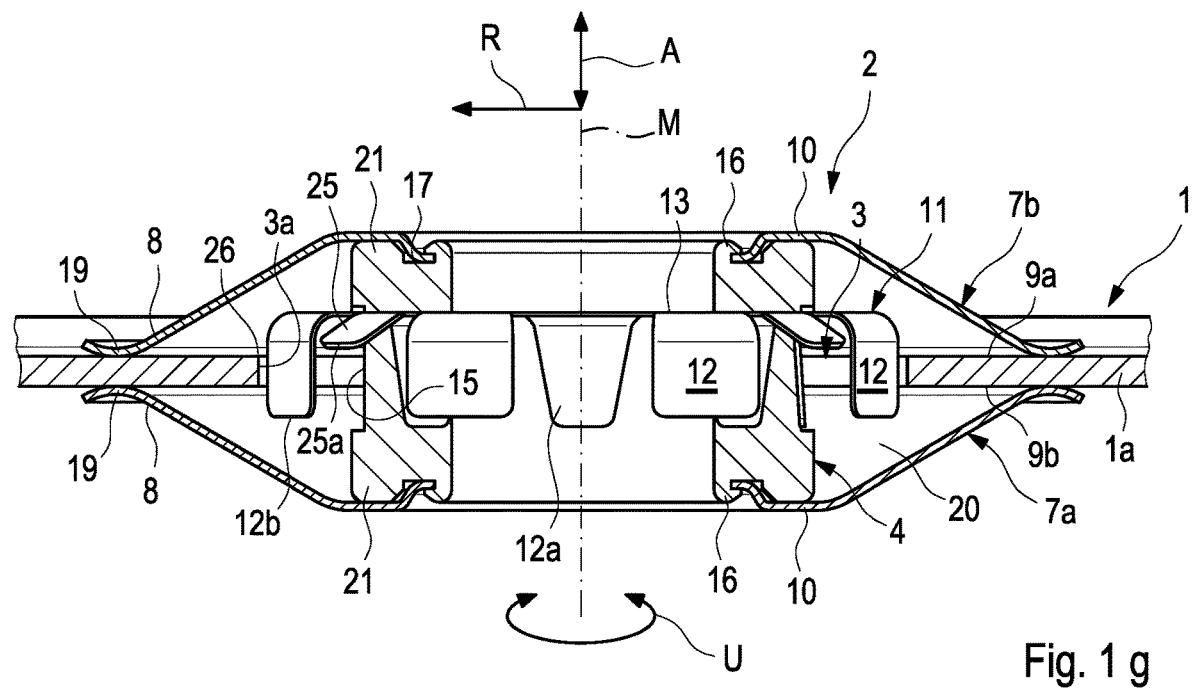

In the intermediate mounting state shown in FIG. 1, it is now only necessary to place a single bridging element 7b (which is not shown in FIG. 1b) onto the free end surface of the sleeve 4 and rivet or crimp it there or fasten it in some other way, e.g. by radially flanging the flanging collar 16 with a suitable flanging tool, e.g. a mandrel, radially outward.

FIG. 1c shows the embodiment according to FIG. 1a in a partially cut-away side view. The closed cavity 20, which can be formed by a non-split variant of the bridging elements 7a, 7b, is clearly visible in FIG. 1c.

FIG. 1c also shows that in the axial direction A, the sleeve 4 has a circumferential collar 21 at one end and at the other end, a circumferential bevel 22 is provided. By means of the bevel 22, the damping element 11, which is embodied for example as an open spring washer or as a split spring washer, can easily be slid onto the sleeve 4 and to the axial stop that is slid through the collar 21.

The entire fastening device 2 according to the invention can thus be composed of only four individual components (sleeve 4; two bridging elements 7a, 7b, and a one-piece damping element 11), it being possible for all of the components to be joined in the axial direction A. The insertion of a partially mounted lower assembly composed of one or both bridging elements 7a, 7b, the sleeve 4, and the damping element 11 can be inserted into the opening 3 of the shielding part 1 in the axial direction A. The invention thus first ensures a fastening solution for shielding parts 1 with very few parts, which can also be easily mounted without the risk of confusion.

FIG. 1d shows a side view of the first embodiment of the fastening device 2 according to the invention mounted in a shielding part 1 in order to form a shielding part 1 according to the invention. In this variant, the bridging elements 7a, 7b have the slit 18 and the spring tabs 19.

FIG. 1e shows a modified example of the first embodiment of the fastening device 2 according to the invention in the mounted state according to FIG. 1d. It is clear that in this modified example (as already described above), the bridging elements 7a, 7b do not have the slits 18 and are embodied as closed cup-like structures. There is thus a complete encapsulation of the closed cavity 20 and thus a good protection against dirt and wear for the inner components.

FIG. 1f shows an example of the placement of the fastener 6, e.g. a screw, with which a shielding part 1 according to the invention can be fastened to a partnered fastening part (not shown). This view makes it particularly clear that the opening 3 in the shielding part 1 is completely covered by the fastening device 2 according to the invention so that a continuous, hole-free design of the shielding part 1 is possible, thus enabling a good thermal shielding because no openings remain through which heat, e.g. in the form of radiation, can pass.

FIG. 1g shows another modified example of the fastening device 2 according to the invention in a shielding part 1 according to the invention; in this embodiment, as in the first examples/embodiments, the spring arms 12 achieve the resilient support of the sleeve 4 relative to the hole rim 3a. On its radial inside, the spring arm support ring 13 has additional spring arms 12a, which are supported on the outside 15 of the sleeve 4. In this case, therefore, the damping element 11 is likewise resiliently supported in the radial direction R relative to the sleeve 4, in particular the outside 15 of it. The damping element 11 is held in a resiliently floating fashion, so to speak, between the sleeve 4 and the hole rim 3a of the opening 3.

In addition, in gaps between each pair of spring arms 12, detent projections 25 are provided, which extend radially outward from the spring arm support ring 13 and tend to extend in the axial direction in the same direction as the spring arms 12.

Free ends 25a of the detent projections 25 in this case are positioned so that these free ends 25a can engage behind a hole edge 26 of the opening 3 in the radial direction R, for example when the damping element 11 according to FIG. 1g is inserted upward from below into the opening 3 in the axial direction A (viewed according to FIG. 1g). The free ends 25a in this case are able to snap behind the hole edge 26 and thus to provide a temporary holding of a preassembled state—for example composed of the bridging element 7a, the sleeve 4, and the damping element 11—relative to the shielding part 1 until the radially inner region 10 of the second bridging element 7b is fastened to the sleeve 4 by means of the flanging collar 16.

This solution thus succeeds in providing a form-fitting holding in the axial direction A of an intermediate mounting state of the fastening device 2 according to the invention relative to the opening 3 in the shielding part 1 until a time at which the second bridging element 7b is securely mounted in place. When a fastening device 2 is completely mounted in the shielding part 1, the detent projections 25 no longer have a function.

Figure 2:
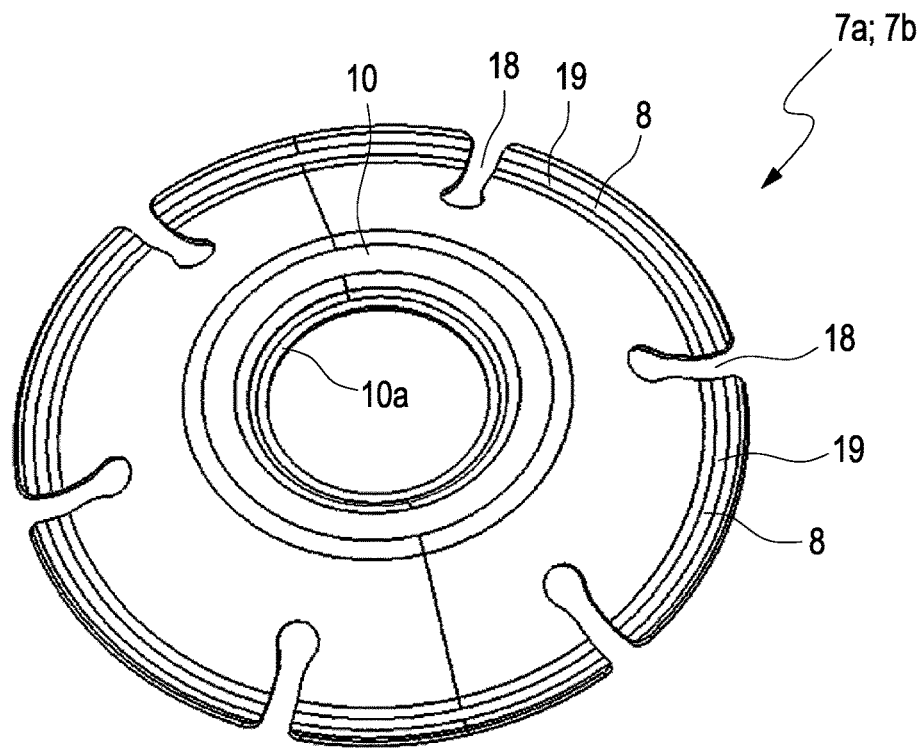
FIG. 2a: shows a perspective view of a bridging element according to the first embodiment of the fastening device.
FIG. 2b: shows a sleeve and a spring element in a preassembled state of the first embodiment of the fastening device according to the invention.
FIG. 2c: shows a partially mounted state of the bridging element according to FIG. 2a and of the subunit according to FIG. 2b.
Figure 2:
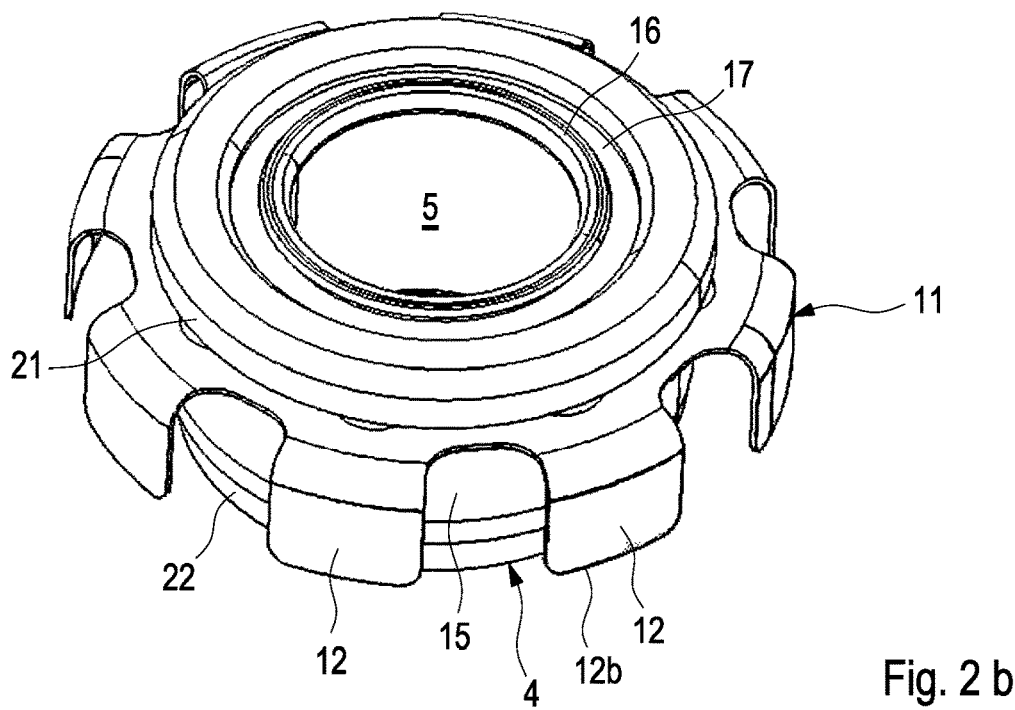
Figure 2:
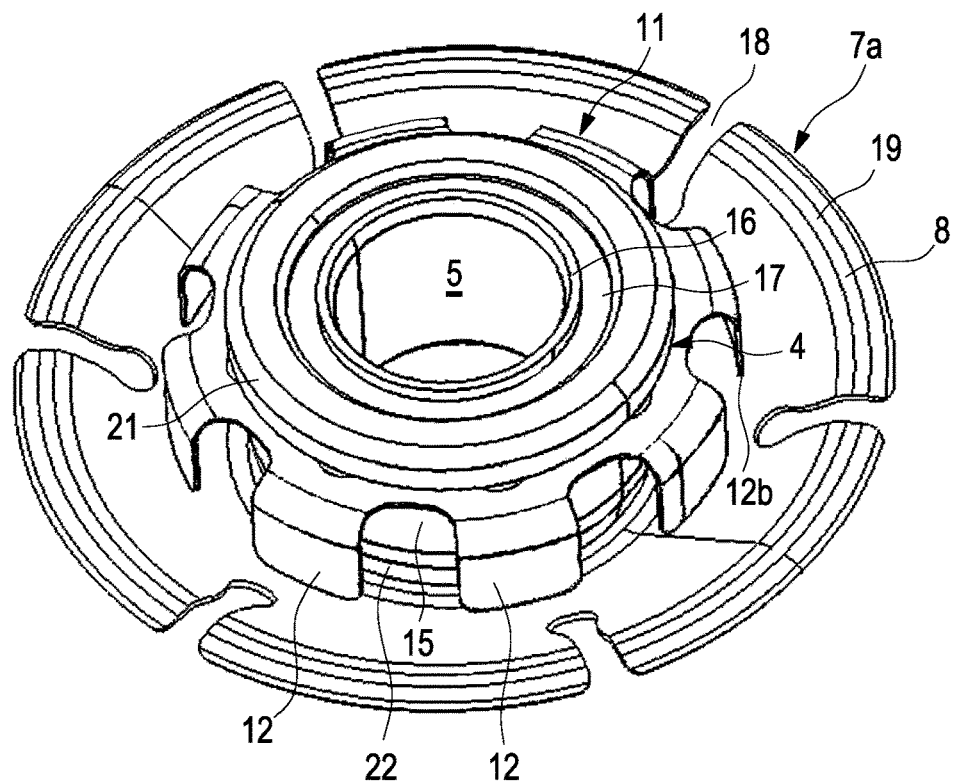

FIG. 2a shows a perspective view of a bridging element 7a, 7b in a split embodiment with the slits 18. The spring tabs 19 form the radially outer region 8 of a bridging element 7a, 7b. The radially inner region 10 is embodied for fastening to one end surface of the sleeve 4 and has a corresponding rim element 10a, which can be embraced by the flanging collar 16 in a form-fitting way.

FIG. 2b shows an intermediate mounting state of a sleeve 4 in the embodiment according to FIG. 2a with the bevel 22. The sleeve 4 is already supporting the damping element 11 with the plurality of spring arms 12. The damping element 11 rests against the circumferential collar 21 in the axial direction A. Naturally, with a sleeve 4 according to the first embodiment, i.e. with a sleeve 4 having a circumferential collar 21 and a bevel 22, it is also possible to use a damping element 11 in the embodiment according to the modified example shown in FIG. 1g with the additional inner spring arms 12a. Such a modified damping element 11 according to FIG. 1g can also have only the (radially outer) spring arms 12 and the additional spring arms 12a (radially inner) and no detent projections 25. Such a modified damping element 11 can likewise be used with a sleeve 4 designed according to the first exemplary embodiment (circumferential collar 21 and bevel 22) and also in the second embodiment according to FIG. 1g with two circumferential collars 21 without a bevel 22.

In any case, a modification can also be provided in which the damping element 11 has the detent projections 25 between the spring arms 12 but no additional spring arms 12a on the radial inside.

FIG. 2c shows a preassembled intermediate mounting state in which one of the bridging elements 7a is connected to the sleeve 4 and the damping element 11. Advantageously, the bridging element 7a, which is positioned opposite the free ends 25a of the spring arms 12 of the damping element 11, is connected to the sleeve 4. Such a preassembled unit, as shown in FIG. 2c, is then inserted in the axial direction A from the outside 9b—which is opposite from the outside 9a of the shielding part 1 and not shown in FIG. 1b—into the opening 3 (also see FIG. 1b in this regard).

Figure 3:
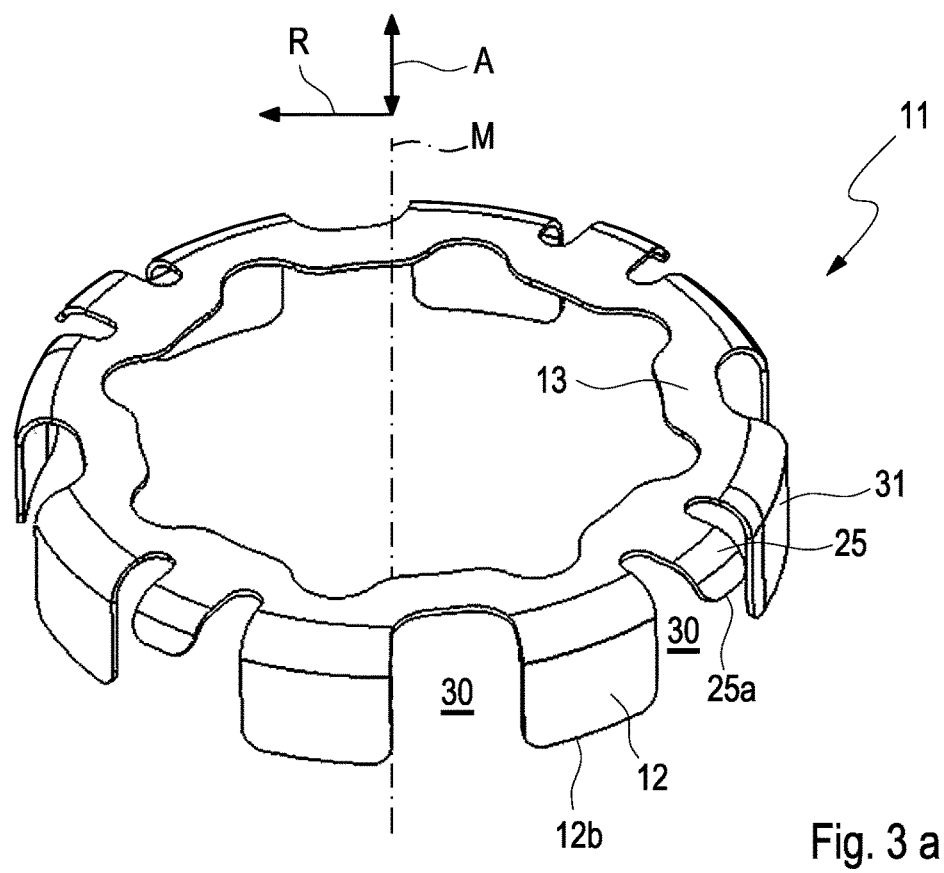
Figure 3:
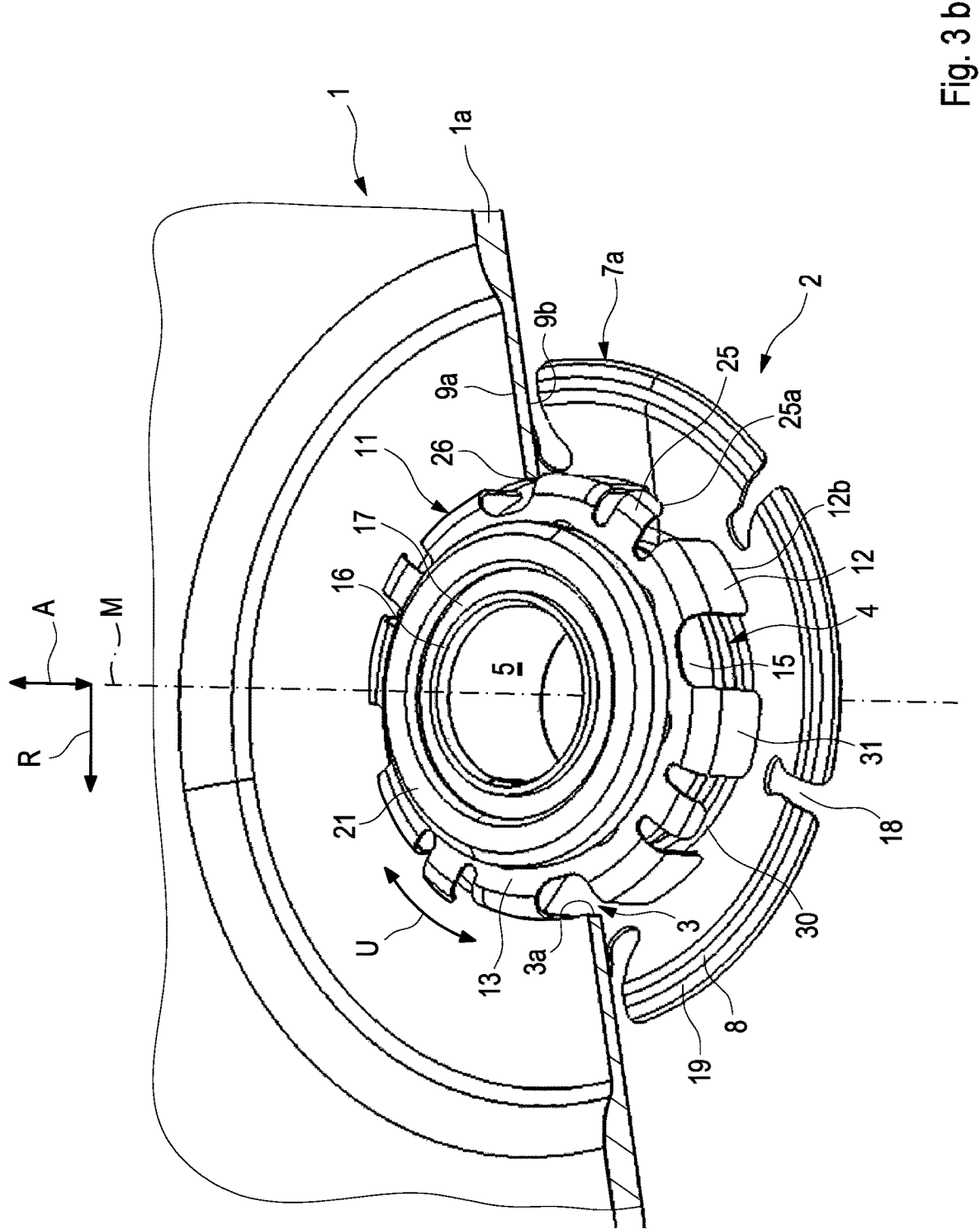

FIG. 3a shows another embodiment of the damping element 11 in which the plurality of spring arms 12 is positioned on the spring arm support ring 13. A detent projection 25 can be provided in gaps 30 between two adjacent spring arms 12, its beginning extending a short distance outward from the spring arm support ring 13 in the radial direction R. As they extend further, the detent projections 25 are embodied as curved and have the free end 25a, which protrudes in the radial direction R beyond an outside 31 of the spring arms 12 and is able to protrude beyond the hole edge 26 (not shown in FIG. 3a, see FIG. 1g) and thus to engage behind the hole edge 26.

The detent projections 25 are arranged in distributed fashion over the circumference and in the exemplary embodiment according to FIG. 3a, four detent projections 25 are provided, with a total of eight spring arms 12.

FIG. 3b shows a partially cut-away partially assembled situation comparable to FIG. 1b for the first exemplary embodiment. It is particularly clear that the spring arms 12 rest against the hole edge 26 and the detent projections 25 embrace the hole edge 26. Such a preassembled intermediate assembly consisting of a bridging element 7a, the sleeve 4, and the damping element 11 can—in the view according to FIG. 3b—be inserted from the outside 9b opposite from the non-visible outside 9a into the opening 3 and can engage there by means of the detent projections 25.

Figure 4:
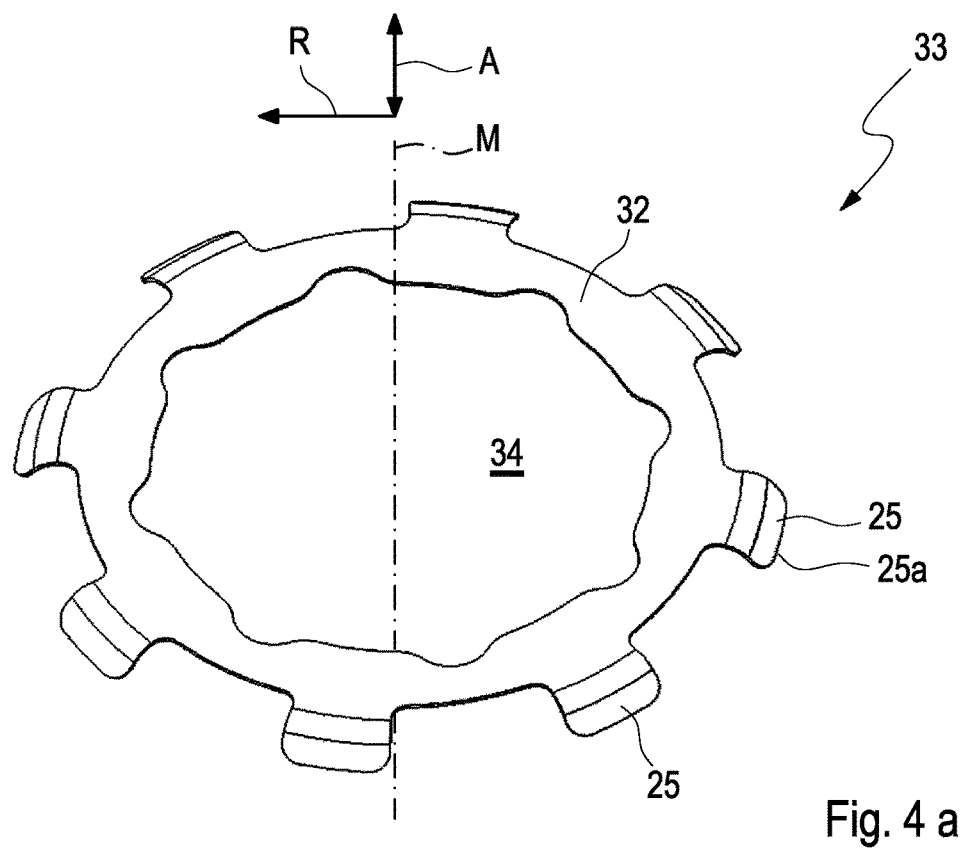
FIG. 4a: shows a detent projection ring for use in a fastening device according to the invention and a shielding part according to the invention.
FIG. 4b: shows the detent projection ring according to FIG. 4a combined with a spring element according to the first exemplary embodiment of the fastening device according to the invention.
FIG. 4c: shows a partially mounted state of the fastening device according to the invention equipped with the detent projection ring.
FIG. 4d: shows another partially mounted state in a shielding part of the fastening device according to the invention according to FIG. 4c.
Figure 4:
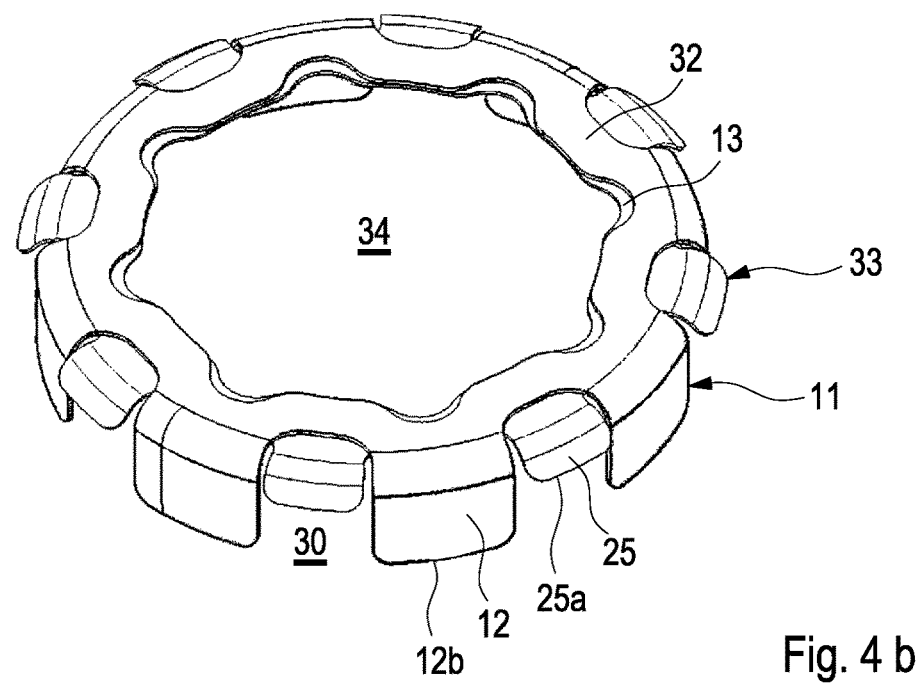
Figure 4:
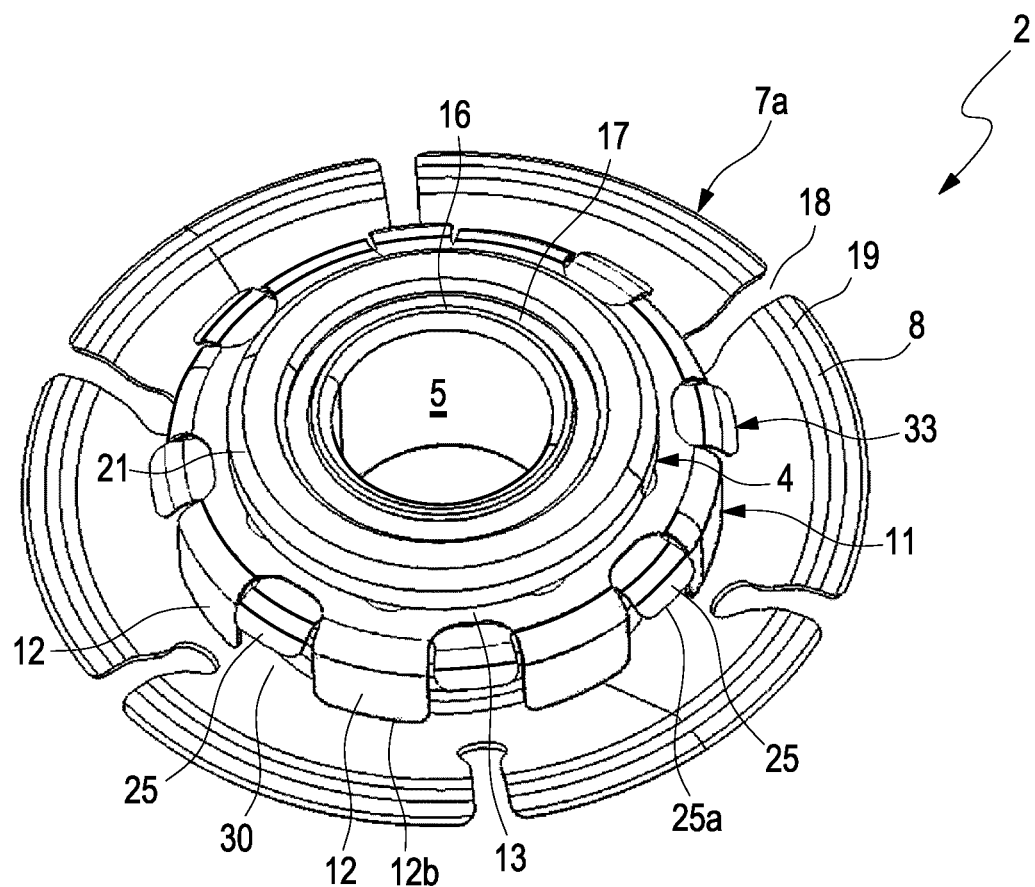
Figure 4:
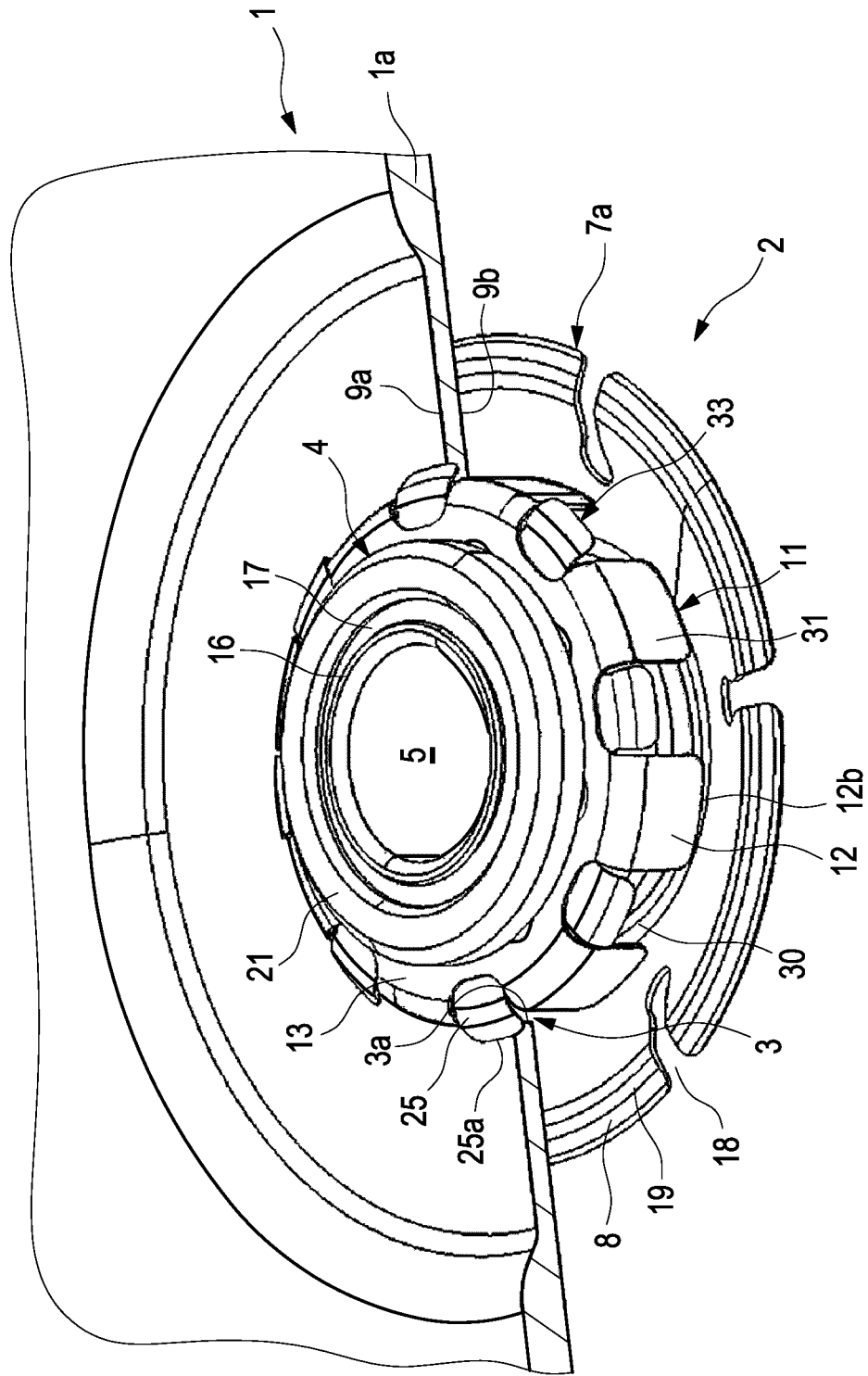

FIG. 4a shows another embodiment in which the detent projections 25 are supported by a detent projection support ring 32 and the detent projection support ring 32 and detent projections 25 form a detent ring 33. The detent ring 33 has an inner opening 34, which is equipped and embodied so that the detent ring 33 can be slid on over the outside 15 of the sleeve 4.

FIG. 4b shows a combination of a damping element 11 of the first embodiment (see FIG. 1a) together with a detent ring 33 according to the embodiment described just above (see FIG. 4a).

The damping element 11 is provided with spring arms 12. The detent projection support ring 32 in this case is slid on underneath the damping element 11 so that the detent projections 25 each come to lie in gaps 30 between two spring arms 12. With this design composed of a damping element 11, which has only spring arms 12, and a detent ring 33, which has only detent projections 25, it is possible to produce a damping element 11 that has the functionality of the damping element 11 in FIG. 3b.

FIG. 4c shows an intermediate mounting state of a fastening device 2 according to the invention with a bridging element 7a, 7b, the sleeve 4, the damping element 11, and a detent ring 33.

FIG. 4d shows the intermediate mounting state according to FIG. 4c in a detent-engaged state in the opening 3 of the shielding part 1 before the second bridging element 7b is connected to the sleeve 4.

Figure 5:
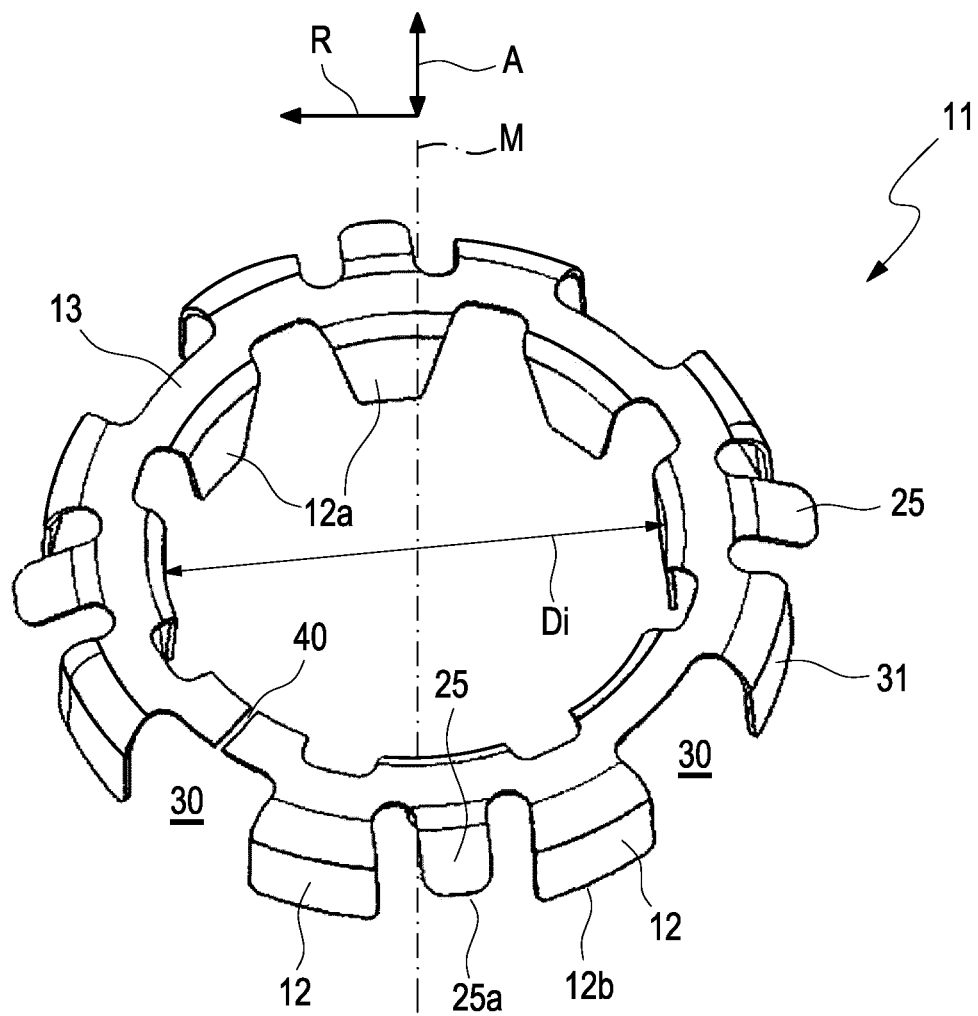
FIG. 5a: shows a perspective view of a third embodiment of the damping element of the fastening device according to the invention.
FIG. 5b: shows a partially cut-away perspective view of a pre-mounted position of a third embodiment of the fastening device according to the invention.
FIG. 5c: shows a partially cut-away isometric view of the third embodiment of the fastening device according to the invention inserted into a shielding part to produce a shielding part according to the invention.
Figure 5:
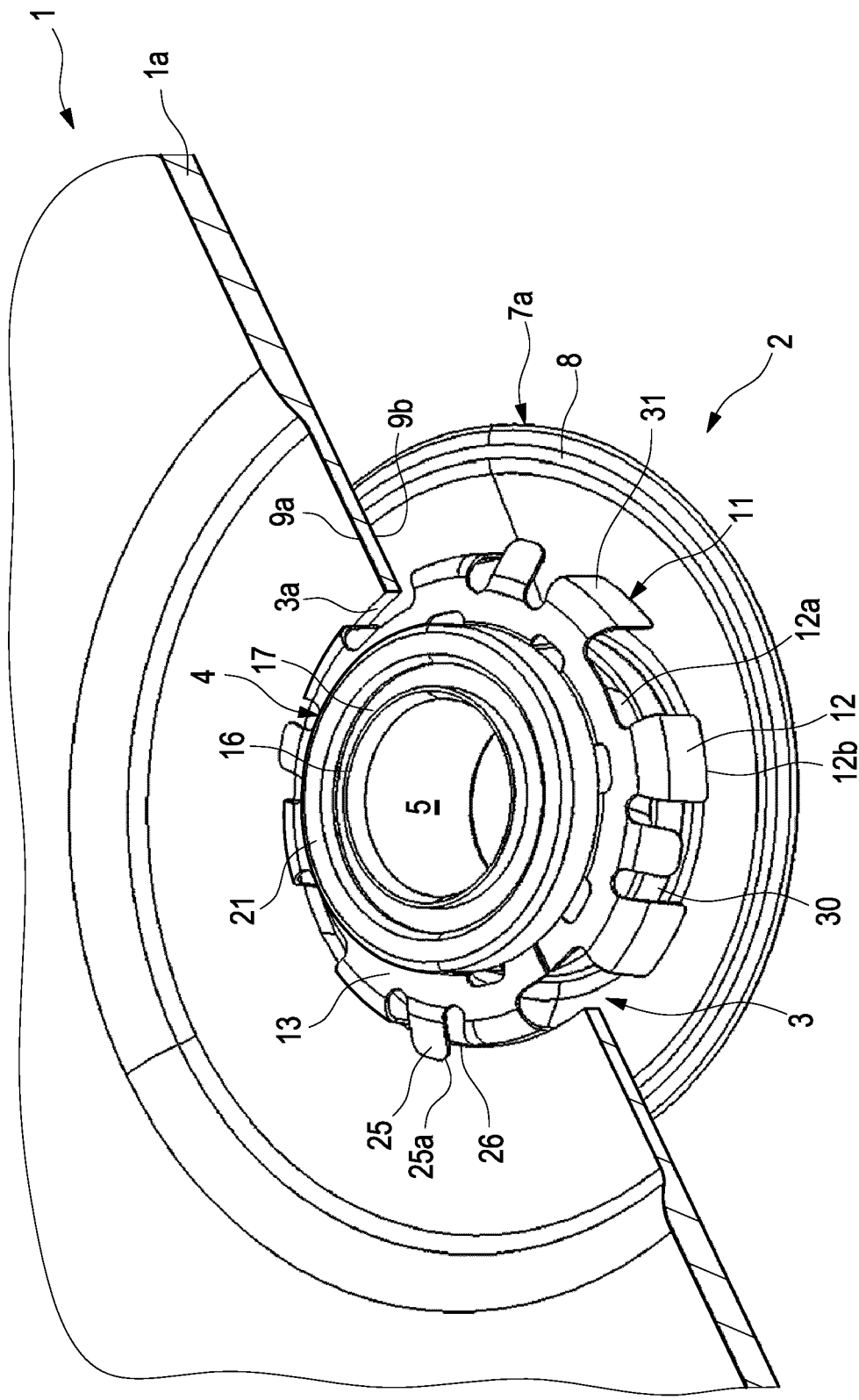

FIG. 5a shows another embodiment of the damping element 11, which was briefly described above in connection with FIG. 1g.

The damping element 11 in this embodiment has the spring arm support ring 13. The spring arms 12 protrude outward in the radial direction R and extend with their free ends 25a in the axial direction A.

In some of the gaps 30 between two spring arms 12, there are detent projections 25 whose free ends 12b are suitable for producing a detent engagement.

Radially opposite from the gaps 30, spring arms 12 also extend inward, which have been referred to above in connection with FIG. 1g as the additional spring arms 12a. These additional spring arms 12a first extend radially inward from the spring arm support ring 13 and then, angled in the axial direction A, extend in the same direction as the spring arms 12.

An inner diameter $D_i$ formed by the additional spring arms 12a corresponds to the outer diameter of the sleeve 4, in particular its outside 15 so that according to this embodiment, a damping element 11 can be placed against the sleeve 4 without play or with resilient prestressing, preferably with resilient prestressing.

To facilitate assembly of such a damping element 11, it is embodied as a split damping element 11 in which the spring arm support ring 13 has a slit 40 passing through it radially at a place on the circumference. With such a design, the damping element 11—as described above—can be mounted around a sleeve 4 in a manner similar to a piston ring.

FIG. 5b shows a partially mounted state of a preassembled state of a fastening device 2 according to the invention having the damping element 11 in the embodiment according to FIG. 5a. In a preassembled position, a preassembled module consisting of the sleeve 4, one of the two bridging elements 7a, 7b, and the damping element 11 is preassembled and inserted in detent-engaging fashion into the opening 3 of the shielding part 1 so that the detent projections 25 engage behind the hole edge 26 and hold the preassembled module according to FIG. 5b in the opening 3 in a form-fitting, detent-engaged way.

Figure 5C:
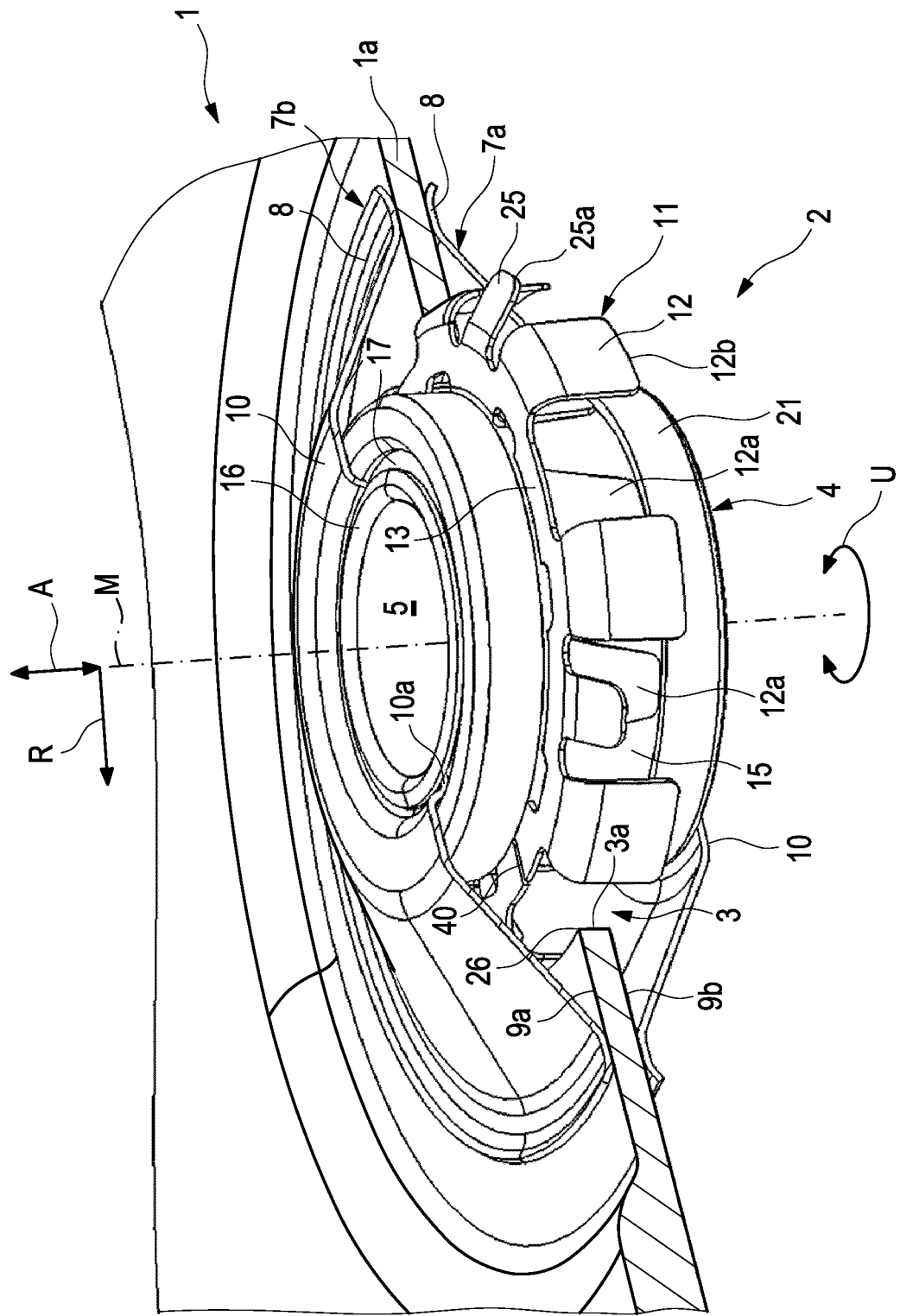

FIG. 5c shows the embodiment according to FIGS. 5a and 5b in a partially cut-away view in a final mounting position with the mounted second bridging element 7b, which is secured in a form-fitting way against the end surface of the sleeve 4 by means of the flanging collar 16. By contrast with the sleeve 4 according to the first embodiment, the sleeve 4 has a circumferential collar 21 in each axial end region of the outside 15 so that between the two circumferential collars 21, a groove is formed in which the damping element 11 with its additional spring arms 12a can be fastened in detent fashion by placing the damping element 11 against the sleeve 4 in the axial direction A.

The invention claimed is:

1. A fastening device for fastening a shielding part to a partnered fastening part, comprising:
    a sleeve with a through opening for a fastener;
    at least two bridging elements, which are equipped and embodied with outer regions in a radial direction for indirect or direct contact with opposing outsides of the shielding part and are fastened to the sleeve with inner regions in the radial direction;
    a damping element positioned between the at least two bridging elements in an axial direction and outside of the sleeve in the radial direction, wherein the damping element is a spring element and has at least one spring arm, which is embodied as resiliently flexible in the radial direction and is equipped and embodied to cooperate in a supporting way with a hole rim of a hole of the shielding part.

2. The fastening device according to claim 1, wherein the damping element is a stamped and bent sheet metal part with at least two of the at least one spring arms arranged in distributed fashion in a circumference direction.

3. The fastening device according to claim 1, wherein the damping element rests against the sleeve without play in the radial direction in a radially prestressed way.

4. The fastening device according to claim 1, wherein the damping element is affixed relative to the sleeve in the radial direction in a rigid or resiliently flexible way.

5. The fastening device according to claim 1, wherein the damping element is an open spring washer.

6. The fastening device according to claim 1, wherein the damping element has at least two detent projections that are equipped and embodied to catch behind a hole edge after being mounted in the shielding part in a mounting direction.

7. The fastening device according to claim 6, wherein the at least two detent projections are positioned in a circumference direction in a respective space between at least two of the at least one spring arms.

8. The fastening device according to claim 7, wherein the at least two spring arms are positioned on a spring arm support ring of the damping element and the at least two detent projections are positioned on a separate detent projection support ring of a detent element.

9. The fastening device according to claim 8, wherein the at least two spring arms are present, which extend out from the spring arm support ring and are provided for a radially inner support of the spring element relative to the sleeve.

10. The fastening device according to claim 8, wherein the spring arm support ring rests in a groove in the sleeve.

11. The fastening device according to claim 1, wherein the at least two bridging elements are each fastened to the sleeve at axial end surfaces of the sleeve.

12. The fastening device according to claim 1, wherein the at least two bridging elements are disk-like, cross-sectionally cup-shaped bodies, which, in an assembled state, cooperate with the shielding part and the sleeve to form a closed annular cavity in which the spring element rests.

13. The fastening device according to claim 1, wherein the sleeve has a flanging collar at each of its two opposing axial end surfaces, to which the at least two bridging elements can be fastened in one work step with an actuating direction of a crimping tool or a riveting tool oriented in an axial direction.

14. A shielding part having at least one fastening device according to claim 1.

* * * * *